US010635092B2

(12) United States Patent
Rose et al.

(10) Patent No.: US 10,635,092 B2
(45) Date of Patent: Apr. 28, 2020

(54) DYNAMICALLY ESTABLISHING COMMUNICATION BETWEEN MOBILE EQUIPMENT AND A PROCESS CONTROLLER

(71) Applicant: HONEYWELL INTERNATIONAL INC., Morris Plains, NJ (US)

(72) Inventors: Matthias Rose, Gelnhausen (DE); Sunil Bale, Karnataka (IN); Ashutosh Singh, Chhattisgarh (IN); Suraj Prakash, Karnataka (IN); Jethro Francis Steinman, Haverford, PA (US); Raj Bandekar, Lansdale, PA (US); John Rosa-Bian, Ambler, PA (US)

(73) Assignee: Honeywell International Inc., Morris Plains, NJ (US)

( * ) Notice: Subject to any disclaimer, the term of this patent is extended or adjusted under 35 U.S.C. 154(b) by 91 days.

(21) Appl. No.: 16/049,330

(22) Filed: Jul. 30, 2018

(65) Prior Publication Data

US 2019/0171186 A1 Jun. 6, 2019

Related U.S. Application Data

(60) Provisional application No. 62/593,336, filed on Dec. 1, 2017.

(51) Int. Cl.
*G05B 19/418* (2006.01)
*H04W 76/10* (2018.01)
*G06K 7/10* (2006.01)

(52) U.S. Cl.
CPC ....... *G05B 19/418* (2013.01); *G06K 7/10366* (2013.01); *H04W 76/10* (2018.02); *G05B 2219/31449* (2013.01)

(58) Field of Classification Search
CPC ........ G05B 19/418; G05B 2219/31449; G06K 7/10366; H04W 76/10
See application file for complete search history.

(56) References Cited

U.S. PATENT DOCUMENTS

| 8,073,007 B2 * | 12/2011 | Tremaine | H04L 29/1232 370/252 |
| 2005/0033124 A1 * | 2/2005 | Kelly | G06F 19/3418 600/300 |
| 2010/0114548 A1 | 5/2010 | Dheenathayalan et al. | |

(Continued)

*Primary Examiner* — Chun Cao

(57) ABSTRACT

A method of dynamically establishing a communication connection for mobile equipment (ME) to a process controller of an industrial processing facility (IPF) configured to run an industrial process. The process controller has a computing device includes a processor with a memory storing a different ME classes including a first ME class that the ME is in. The computing device is configured to implement dynamic establishment of a communication connection for ME to the process controller, including reading a representation of a first industrial protocol for the ME while docked at the process controller, translating the representation into a first industrial protocol address, and setting the first industrial protocol address as a first configuration instance in its industrial protocol infrastructure block to render the ME an attached ME. After undocking the ME, the process controller communicates with the ME while controlling the industrial process.

13 Claims, 10 Drawing Sheets

(56) References Cited

U.S. PATENT DOCUMENTS

| | | | | |
|---|---|---|---|---|
| 2010/0134257 A1* | 6/2010 | Puleston | ............. | G06K 7/0008 340/10.4 |
| 2012/0029661 A1* | 2/2012 | Jones | ................ | G05B 19/0426 700/17 |
| 2016/0140499 A1* | 5/2016 | Mitti | ..................... | G06Q 10/10 705/7.27 |

* cited by examiner

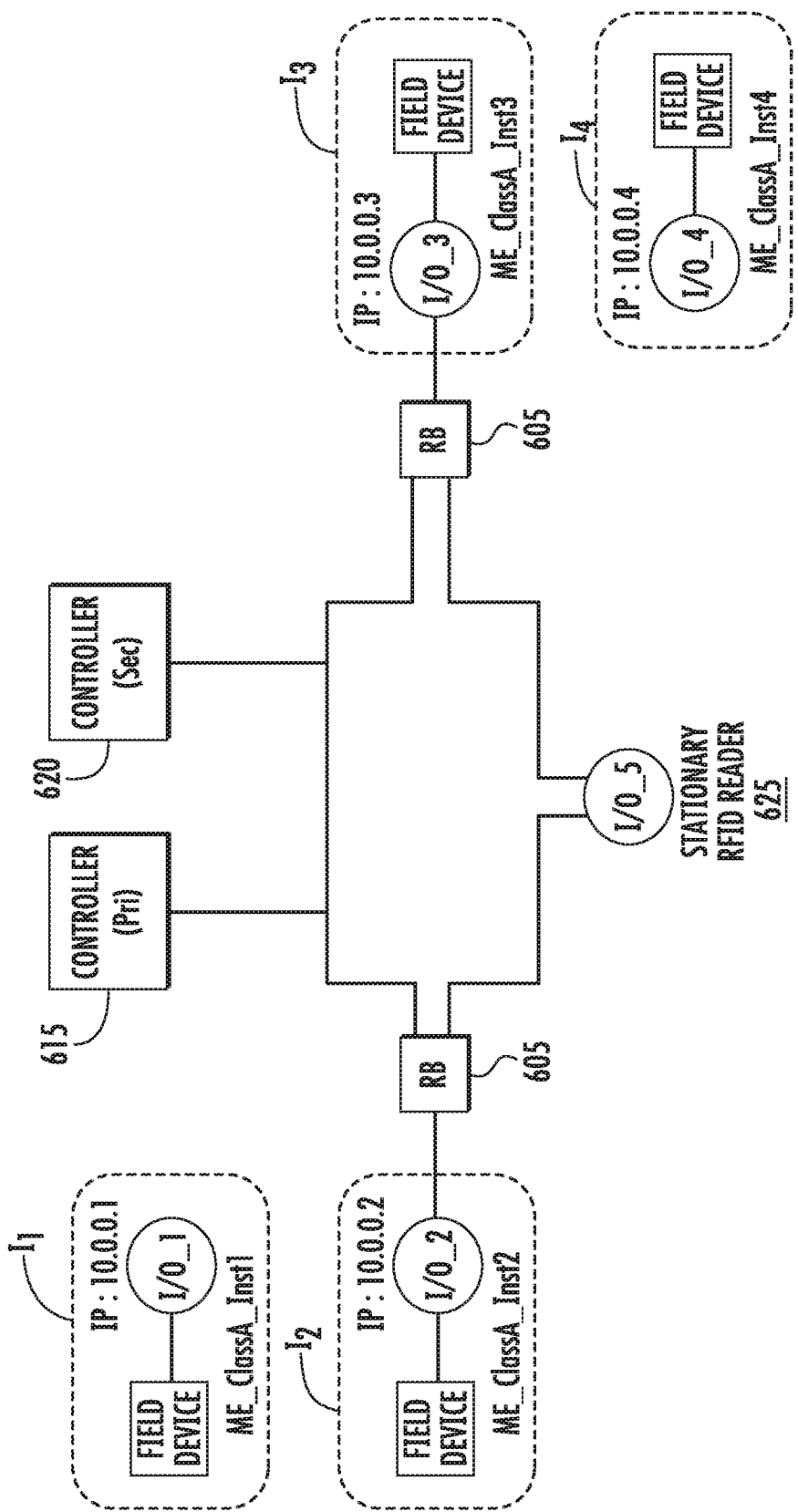

DYNAMICALLY ESTABLISHING COMMUNICATION BETWEEN MOBILE EQUIPMENT AND A PROCESS CONTROLLER

CROSS REFERENCE TO RELATED APPLICATIONS

This application claims the benefit of Provisional Application Ser. No. 62/593,336 entitled "DYNAMICALLY ESTABLISHING COMMUNICATION CONNECTIONS FOR MOBILE EQUIPMENT TO A PROCESS CONTROLLER", filed on Dec. 1, 2017, which is herein incorporated by reference in its entirety.

FIELD

Disclosed embodiments relate to process controller communications with mobile equipment in an industrial processing facility (IPF).

BACKGROUND

IPFs are often managed by configuring an industrial plant control system (IPCS). Example processing facilities include manufacturing plants, chemical plants, crude oil refineries, and ore processing plants. Among other operations, process control systems typically manage the use of motors, valves, and other industrial equipment in the processing facilities. In conventional process control systems, controllers are often used to control the operation of the industrial equipment in the processing facilities. The controllers could, for example, monitor and control the operation of the industrial equipment and generate alarms when malfunctions occur.

"Control processes" are often implemented in conventional controllers using "function blocks." Control processes typically represent processes or functions implemented by the conventional controllers to control the industrial equipment in the processing facilities. Function blocks typically represent executable software objects that perform specific tasks. Any of a wide range of functions could be represented by the function blocks. A combination of particular function blocks may be used to implement a specific control process in a conventional controller.

As used herein mobile equipment (ME) refers to equipment which is not installed in a fixed place in an IPF. The ME can comprise a device (e.g., a sensor) that is coupled by a wired connection to an I/O module (IOM) to exchange analog and digital signals with a process controller. As used herein an IOM can be implemented in software, in firmware, in hardware, in an application-specific integrated circuit (ASIC), a customer programmable logic device (CPLD), and/or in a field programmable gate array (FPGA). A ME is generally a combination of hardware and software that is also configurable.

The ME is described herein in a non-limiting example is a field device (e.g., a sensor) coupled to an IOM in the examples described below. The IOM of the ME is connectable by a physical connection to generally communicate over the Ethernet with the process controller. The process controller connects and disconnects with the IOM of the ME, and when connected receives data from the ME generally over the Ethernet through the IO. The ME can broadly comprise essentially any ME, such as a modular process skid (a process system contained within a frame that allows the process system to be easily transported), a robot, or a tool changer which supports or executes the reconfiguration/restructuration.

The ME can thus be physically moved around to fulfill production exercises. If the same process control algorithm needs to be applied to multiple places, it can be done using a moveable I/O of different production ME units. Depending on its physical construction an ME can be either for a single purpose or for a multi-purpose. The MEs can be classed (or typed). ME classes are the logical set of physical ME instances with the same layout and/or purpose(s). For example, if ME class A comprises a particular field device (e.g., a pressure sensor) and an I/O module, the ME class will change if there is a temperature sensor with an I/O module and thus a different purpose. Several different classes of MEs are usually attached to each process controller.

In a production station comprising machines and devices, to establish a communication connection between MEs and a process controller, MEs are physically connected to the control system at a ME host bay which is a place at a production station where an ME can be physically connected (or disconnected) by an individual such as an operator. The term 'production station' as used herein is a place in an industrial plant where equipment such as a reactor or a machine, and their supporting devices/installations are installed in order to support a field operator to execute steps to produce a product or a material. This conventionally requires electronically and mechanically manually connecting and disconnecting the ME's process operation under control of the control system. The manual steps include connection or disconnection of process flows, connection or disconnection of communication networks and configuration or de-configuration of SW control objects.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize that, aside from the process flow connections which must typically be done manually, the conventional manually connecting and disconnecting of network communications and reconfiguration of control objects for MEs to a process controller for establishing a communication connection between the MEs and the process controller often results in problems associated with this manual integration. Because there is no automatic solution available for connecting and disconnecting MEs to establish a communication connection to a process controller, only one physical instance of ME is connected to a given controller at a given time even if there are several MEs having the same ME class to be connected to that process controller. Thus, each physical instance of the same ME class is connected in a separate manual data entry step to a given process controller. The conventional process of changing the process controller connection from one ME to another new ME to be connected includes manually disconnecting the ME from the process controller and connecting another ME to the process controller, with an application engineer deleting the in-use IOM from the process controller, configuring a new address (e.g., IP address) for the new to be connected ME, and loading the new address to the process controller and initiating the connection to the new ME.

This conventional ME connection changing process is thus a tedious process for application engineers as well as operators acting on alarms coming from old or new ME and field technicians connecting/disconnecting, including manually entering the IP address and network configuration to the process controller, which can impact other functionality during ME connect as well as during ME disconnect. When the ME is disconnected intentionally from the process controller, there remains a potential for generating unwanted alarms that can flood the operator station with a nuisance alarm. This impacts the responsiveness of the operator at the operator station. To increase the production throughput, it is desired that more than one physical instance of the same ME class can be connected to the same process controller at the same time. There is believed to be no known solution known to be available to achieve this simultaneous multiple ME connection to a process controller.

Disclosed embodiments solve these problems by providing a process controller comprising a computing device including a processor with at least one associated memory that stores a plurality of different ME classes including a first ME class, where the computing device is configured to implement dynamic establishment of a communication connection for an ME to the process controller. The establishment includes reading a representation of a first industrial protocol for an ME that is in the first ME class while it is docked at the process controller, translating the representation to a first industrial protocol address, and setting the first industrial protocol address as a first configuration instance in its industrial protocol infrastructure blocks in its memory to render the ME an attached ME.

After undocking the ME, the process controller communicates with the attached ME while controlling the industrial process. In the batch processing industry, disclosed dynamic establishment of a communication connection for an ME to a process controllers solves the need for the process controller being able to dynamically and automatically reconfigure and simultaneously connect to a plurality of MEs using a single configuration instance loaded in the process controller, which provides a significant productivity advantage for the customer.

BRIEF DESCRIPTION OF THE DRAWINGS

FIG. 6C shows the first example configuration showing 4 physical instances of the class A ME each having I/O's configured with different IP addresses, now with physical instances 2 and 3 of class A ME docked at the process controller.

DETAILED DESCRIPTION

Figure 1:
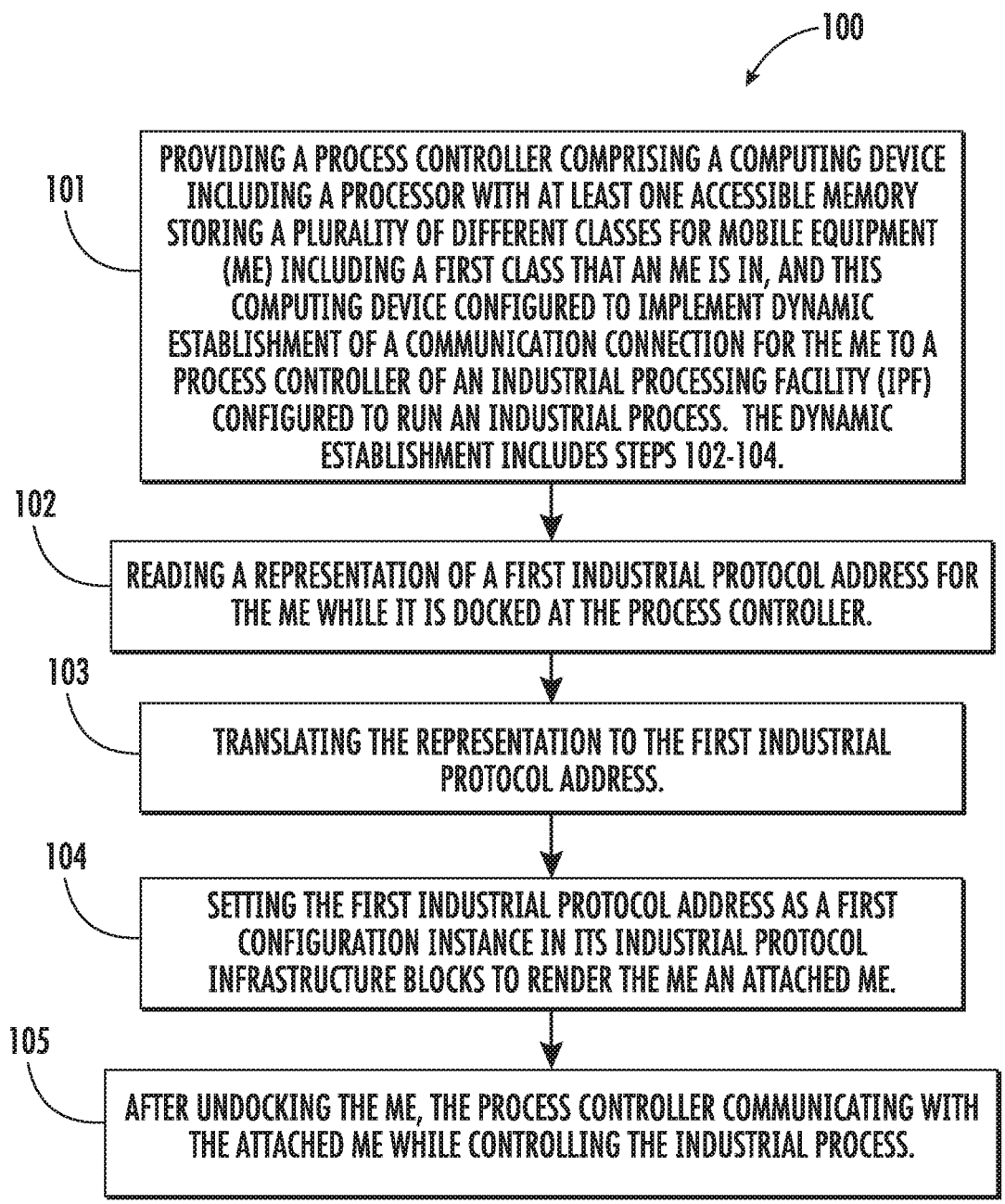
FIG. 1 is a flow chart showing steps in a disclosed method of dynamically reconfiguring and connecting multiple instances of ME that can be in different ME classes for the ME to communicate with a process controller of an IPF which runs an industrial process, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein an IPF runs an industrial process involving a tangible material that disclosed embodiments apply, many running batch processes. For example, oil and gas, chemical, beverage, pharmaceutical, pulp and paper manufacturing, petroleum processes, electrical, and water. An IPF is distinct from a data processing system that only performs data manipulations.

As known in the art, computing devices, such as computing devices configured to implement a disclosed dynamic and automatic establishing a communication connection for an ME to a process controller may be implemented by hardware, implemented by software, or be implemented by a combination of hardware and software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern with hardware including digital logic. Regarding software-based implementations, algorithm code stored in an associated memory can be implemented by a processor. The processor can comprise a digital signal processor (DSP), a microcontroller, an application specific integrated circuit (ASIC), a general processor, or any other combination of one or more integrated processing devices.

A central concept in this Disclosure is to have a generic class-based infrastructure in the process controller for as many instances of ME classes that can be connected to the same controller at the same time. As used herein "as many instances of each class of ME as can be connected in the same controller at the same time" means for example if there are 5 Mobile temperature controllers connected and controlled by a process controller, then 5 instances of the temperature controller class of MEs has to be loaded on to the process controller. The challenge to implement such a generic class-based infrastructure in the process controller is that the process controller cannot predict which physical ME instance (i.e. which address for the ME, such as an IP address) might appear for setting up the communication. In order to solve this issue the address of the ME is read, such as a unique identification mechanism including an address or number that can be read by a device such as using RFID, proximity sensor, mechanical coupler or other address reading mechanism such as a bar code reader, operator' manual data entry on a human machine interface (HMI) panel, addressing plug with hardcoded address information, IP address search). After reading the address there is a dynamic change of the address which may comprise several digits or octects, as referenced by the process controller. For example, implementing a dynamic change in address infrastructure blocks in the memory of the process controller can be enabled by IOM software blocks that are loaded onto the controller.

The process controller will know the address of a ME arriving at the docking station of the controller, such as using a stationary radio frequency identification device (RFID) scanner at the controller or reading an RFID tag on the ME itself. As soon as the process controller 'knows' the IP address of a ME that is docked (physically connected to the stationary controller, where the ME is moved in and physically connected at the controller) it can set this address in its IOM software blocks which enables it to communicate with the attached ME. This is believed to be the easiest way of having minimum of infrastructure definitions in the process controller. The process controller will no longer need infrastructure (IOM software blocks) for each ME, and only needs infrastructure (IOM software blocks) for each ME class to be attached to the controller times the maximum number of instances of an ME to be attached.

FIG. 1 is a flow chart showing steps in a disclosed method 100 of dynamically establishing a communication connection for a ME to a process controller of an IPF which controls an industrial processing facility having processing equipment configured to run an industrial process. Step 101 comprises providing the process controller comprising a computing device including a processor with at least one accessible memory storing a plurality of different ME classes including a first ME class, where the computing device is configured to implement dynamic establishment of a communication connection for an ME to a process controller, with the connection establishment comprising steps 102 to 104 described below.

Step 102 comprises reading a representation of a first industrial protocol address for an ME that is in the first ME class while docked at the process controller. The representation can be a number which is in an IP address, or the representation can be a unique identifier which maps to a ME using storage (memory) of the process controller. The ME is docked to the ME host bay to enable reading its address or a number that can be translated into its IP address. Docking is a physical connection so that the IOMs can be physically connected to the process controller. For example, connecting an Ethernet-based IOM on the ME to a switch that the process controller is connected to. This docking/physical connection is necessitated with the kind of communication media that the ME uses. The reading for identification of the ME need not be wired. For example, an RFID reader at the process controller can read a tag associated with the ME to identify which ME it is.

Step 103 comprises translating the representation of the ME to the first industrial protocol address. Translating can comprise using a stored relation or equation, or a multi-bit (e.g., 32) integer can be translated for example to an ipv4 IP Address. The process controller can read and then set the right value to an IOM software block in its memory. Step 104 comprises the process controller setting the first industrial protocol address as a first configuration instance in its industrial protocol infrastructure blocks to render the ME an attached ME meaning it is communicably attached. In step 105 after undocking the ME, the process controller communicates with the attached ME while controlling the industrial process which as known in the art includes utilizing sensor data with control algorithms to control actuators for controlling the processing equipment and this the process run in the IPF.

A variety of industrial protocols may be used. The industrial protocol can comprise Ethernet which as known in the art is a set of network related technologies (covering the physical layer, data frames, network topology, etc.) defined by the IEEE 802.3 standards. One particular protocol is Ethernet/IP™ which is an industrial network protocol that adapts the common industrial protocol to standard Ethernet, where ETHERNET/IP™ defines the way data is organized inside a TCP/IP Packet. ETHERNET/IP™ or other protocol such as MR ProfiNet, Modbus TCP, or a vendor proprietary Ethernet protocol, can be used to manage the connection between various automation devices such as robots, PLCs, sensors, CNCs and other industrial machines. It is managed by the Open DeviceNet Vendors Association (ODVA) and is based on the Common Industrial Protocol (CIP). TCP/IP is also known as Modbus TCP/IP. TCP/IP is responsible for the transmission of the packets, which are composed of Modbus frames containing commands to read/write into the shared memory of a device. It is quite easy to learn, as TCP/IP is standard in most programming languages (e.g., C/C++, Matlab, Python, etc.) and Modbus is comparatively simple.

Figure 2:
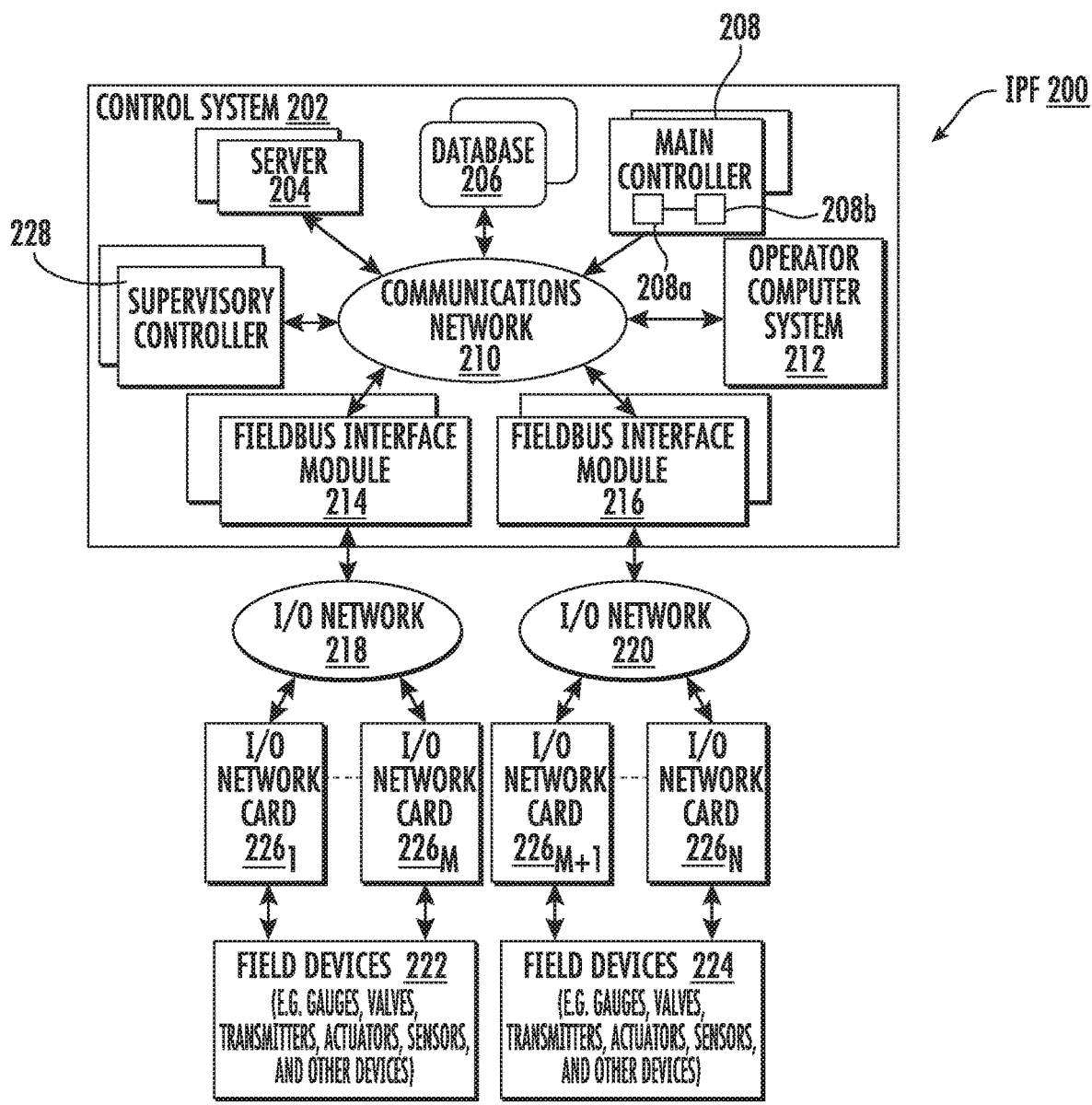
FIG. 2 is a depiction of an IPF that runs an industrial process which can benefit from utilizing a disclosed dynamically reconfiguring and connecting of MEs to a process controller.

FIG. 2 is a depiction of an IPF 200 including a process control system 202 that can benefit from utilizing disclosed dynamically reconfiguring and connecting of process controllers to MEs. As shown in FIG. 2, the IPF 200 comprises of a control system 202, I/O networks 218, 220, and field devices 222, 224. The IPF 200 can also be comprised of I/O network cards $226_1, \ldots, 226_N$ residing between the I/O networks 218, 220 and the field devices 222, 224. I/O network cards are well known to those having ordinary skill in the art, and therefore will not be described herein.

The control system 202 typically has a distributed network configuration, i.e., there are application specific modules 204, 206, 208, 214, 216, 228 connected to each other and an operator computer system 212 via a common communications network 210. More specifically, the control system 202 is comprised of a server 204, a database 206, a main controller 208, an operator computer system 212, Fieldbus Interface modules (FIMs) 214, 216, and a supervisory controller 228. The main controller 208 comprising a computing device including a processor 208a with at least one accessible memory shown as memory 208b which stores a plurality of different ME classes that is configured to implement dynamic establishment of a communication connection for an ME to a process controller generally implemented at the main controller 208. The listed devices 204, . . . , 208, 212, . . . , 216, 228 are communicatively connected to each other via the common communications network 210, which may be an Ethernet Network. The FIM 216 can more generally be an Interface module or a process controller. Any or both can apply as long as it includes a path to the I/O network.

The control system 202 is communicatively connected to the field devices 222, 224 via the I/O networks 218, 220. The I/O networks 218, 220 can be fieldbus-based. The phrase "Fieldbus", as used herein, refers to an all-digital, serial or parallel protocol, two-way communications system that serves as a network (e.g., a local area network) for industrial distributed network devices 204, . . . , 208, 212, . . . , 216, 228 and field devices 222, 224. The field devices 222, 224 include, but are not limited to, motors, pumps, gauges, valves, transmitters, actuators, boilers, distiller units, and sensors.

A docking station which functions as the ME host bay is generally a physical part of the I/O networks 218, 220 such as an Ethernet switch, or another device in the Ethernet topology providing a network port where the ME can be connected to the IP network with its logical pipe. From this point there is another functional block between the I/O network 218 and its I/O network cards $226_1, \ldots, 226_M$, as well as between the I/O network 220 and I/O network cards $226_{M+1} \ldots 226_N$. The reader identification device, such as an RFID reader, is part of the I/O network 218, 220 because it forms another I/O card, but is not on board of the ME, as it is a fixed installation at the place where the ME is placed while in use at a production station.

The ME hosts the I/O network card of the I/O networks 218, 220 and field devices 222, 224 or just field devices in the case of only compact field devices, such a being Ethernet attached transmitters on the ME with no I/O cards. Such a ME can then connect to either a FIM 214, 216 or the main controller 208 directly. The operator computer station 212 is just an operator station to operate the process or help with docking/undocking of MEs.

Figure 3:
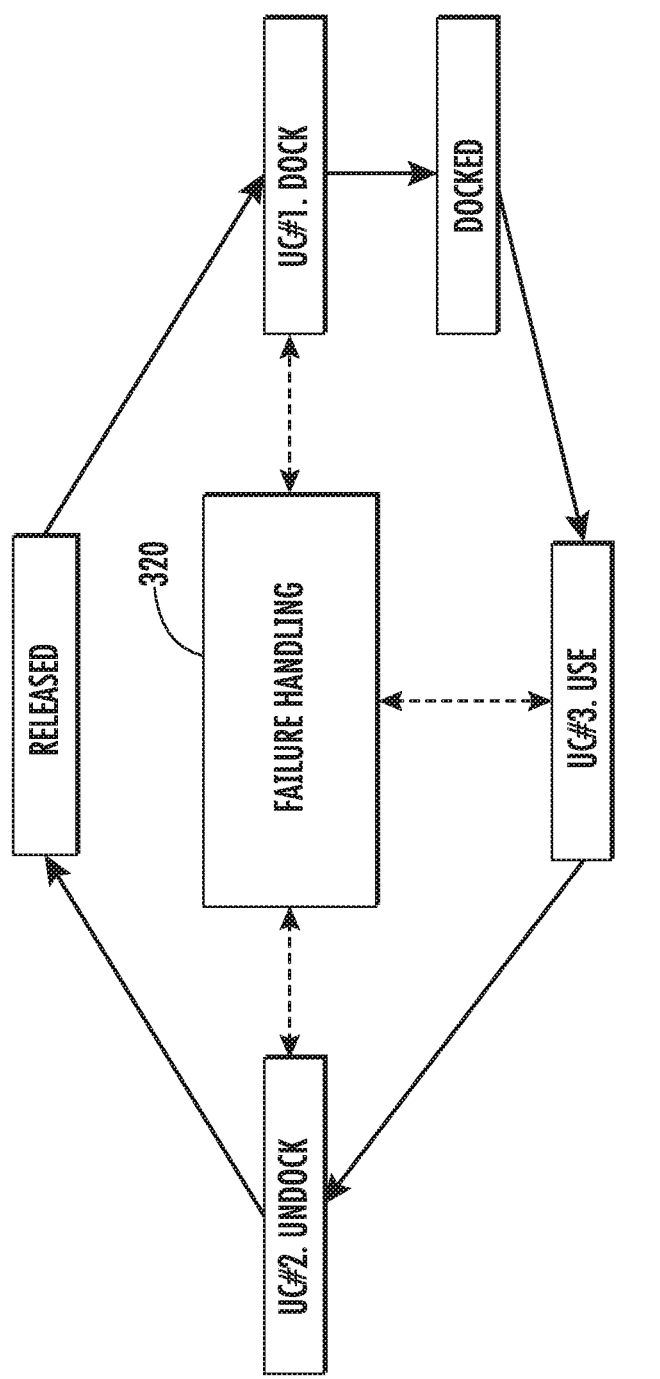
FIG. 3 shows states including uses cases 1 (dock ME), 2 (undock ME) and 3 (use ME) for an example general state machine of a ME host bay of an operator station.

FIG. 3 shows disclosed states including uses cases 1 (UC#1) (dock ME), UC#2 (undock ME) and UC#3 (use ME) for an example general state machine of a mobile equipment host bay that are further described below. There are two types of connectivity involved with MEs. One is the process flow connectivity (physical pipes), while the other is the electronic communication connectivity. The failure handling block 320 executes procedures in case of a connection failure. Regarding operation of the failure handling block 320, depending on the ME status (DOCK, USE or UNDOCK) can result in different actions. During a dock/undock process it could provide an alarm for the user and stop automatic processing and ask for confirmations and/or manual intervention. During "USE" it can provide an emergency shutdown of the product flow path in/out the mobile equipment or any other operation or shutting down power of the ME (or for parts of it). The ME itself is expected to go to a safe state itself because the most likely case is to lose communication, and then such a failure handling has nothing it can do. In such a case the failure handling takes care of the protection of the plant and environment at the stationary equipment upstream, downstream of the production line as well as for the docking bay itself.

Figure 4:
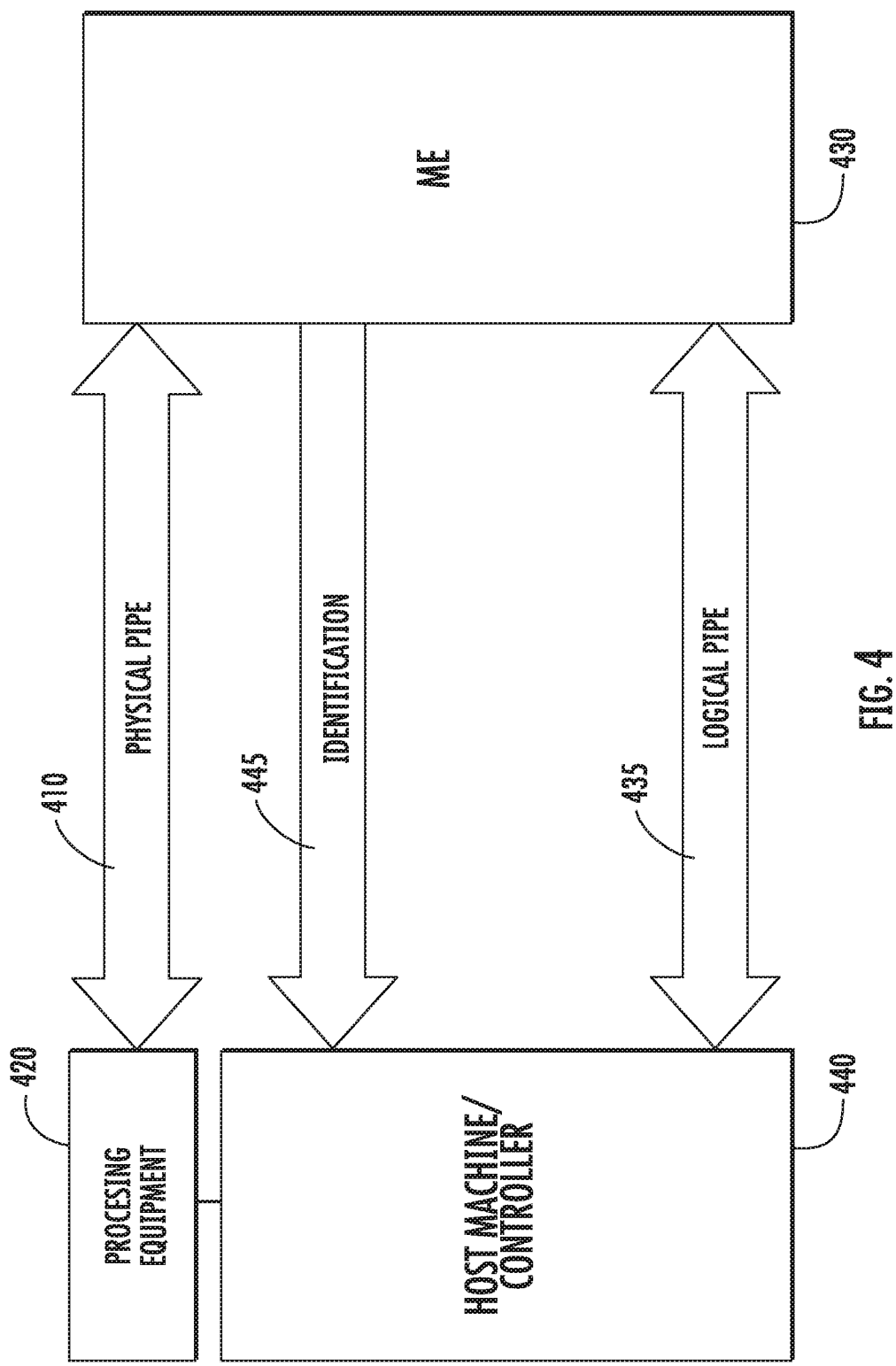
FIG. 4 depicts the connection pipes between an ME and a host machine.

FIG. 4 depicts the physical pipe 410 between the processing equipment 420 and the ME 430 and logic connection pipes between an ME 430 and a host machine or process controller 440 such as main controller 208 shown in FIG. 2. The physical pipe 410 is a physical connection and the logical pipe 435 is a protocol specific connection which can be Ethernet IP™ PROFINET or similar protocol. The 'identification' 445 shown represents the host machine, such as the main controller 208, reading the IP address or other mechanism to identify the ME 430 such as a bar code reader, mechanical identification, or hard coded address plug.

Figure 5A:
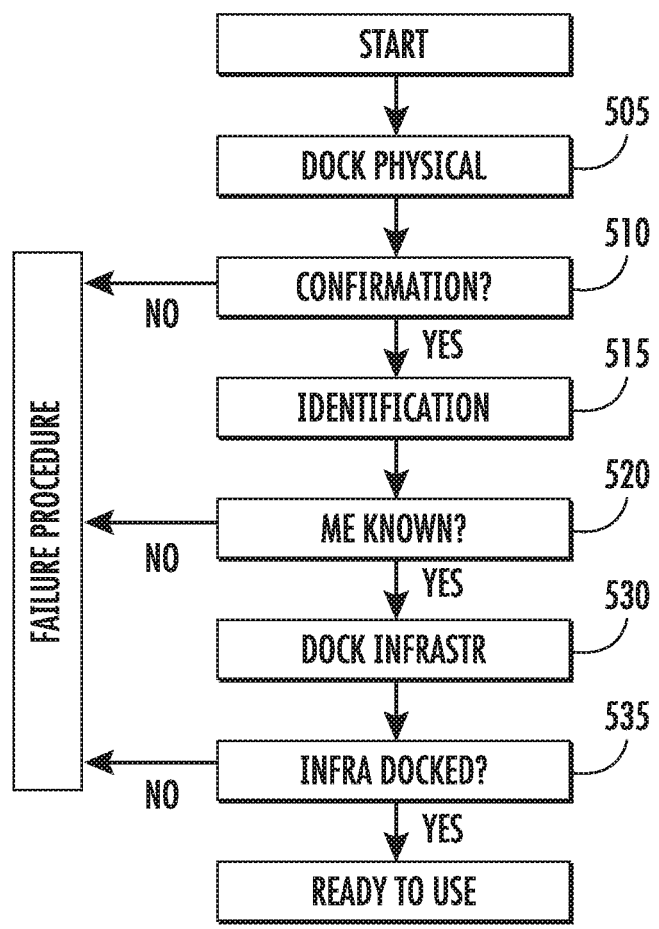
FIG. 5A is flow chart showing a sequence of steps for implementing use case 1.

FIG. 5A is flow chart showing a sequence of steps for implementing UC#1 beginning at start and ending in "being ready to use" the ME. The start trigger for UC#1 for an ME can come from a variety of difference sources such as from an operator, a batch recipe or from an independent sequence such as a sequential control that can be triggered independently from a batch either by the operator or by an internal condition (i.e. reading of a trigger input in the same controller or a controller in the same system) or by an external condition (i.e. a trigger sent by $3^{rd}$ party software using the DCS system as a path to control the sequence). In order to ensure that the ME docking process can be executed smoothly (without any failures which were detectable before the start), it is generally the responsibility of the trigger to verify and confirm any upfront start conditions. For example to confirm the correct connection of all physical pipes, cables and hoses. Such a check can be either automatic (in case there are sensors available to do so), manual by an operator followed by a confirmation input at the distributed control system (DCS) HMI user interface (UI), or any combination of both methodologies. Physical docking of the ME then occurs.

Step 505 comprises physically docking an ME at an ME docking station. More than 1 ME be docked at a given ME docking station at any given time. Depending on the type of the docking station and/or the type of the ME being docked more than one ME can be docked to a production ME docking station at the same time either in parallel (splitting the product flow and have a parallel usage of the MEs docked at the ME docking station) or in series (the product flow through the MEs one after the other). The physical docking procedure of the ME can include a series of interactive operator instructions, a combination of manual, semi- or fully-automated sequences, or standard operating procedures (SOPs) on a paper to be executed by the operator. A confirmation stage, step 510, can follow where it is reconfirmed that the physical docking process has been executed correctly. The confirmation stage can comprise confirmation by the operator on the HMI of the host system (e.g., accompanied by an electronic signature (eSig)) and/or any semi- or fully-automated check of the host system, because the logical ME infrastructure is not yet connected to the host machine. Such checks can be done for example by limit switches at the host machine or other physical measurements such as provided by pressure sensors.

The checks can vary based on the ME class of the physical ME instance connected. In case the confirmation is okay, the procedure moves on. In case the confirmation fails, a failure procedure is executed by a failure procedure block 320a that depends on the ME and whether or not the connection process could recovered or should be aborted.

After a successful confirmation, identification follows, with step 515 being identification. Identification is used to identify the physical instance of the ME docked. Such identification can be performed for example by operator entry (e.g., with an eSig), by reading a barcode using a stationary barcode reader at the host machine, by reading at RFID tag using a stationary RFID reader at the host machine, or other automatic detection procedure.

After a successful identification, the host machine, such as main controller 208, decides in step 520 whether or not the ME identified is known (i.e. the host knows how to handle the ME) and expected (i.e. instance of the expected ME class has been connected). A dock infrastructure step 530 follows where the host machine activates the infrastructure for the detected and identified ME instance. The infrastructure itself is class-based and the host machine hosts as many instances of the infrastructure as ME instances of the same class can be connected to the host machine at the same time. The controller provides docking infrastructure such as the physical Ethernet ports where the ME can dock its network cable for the logical pipe. Step 535 comprises checking whether infrastructure is docked. Devices mounted on such equipment can have several self-checking features, and provides the results via the infrastructure to the host. Furthermore, one might have sensors which are checking the correct physical positioning at the docking back as well as physical sensor detection whether or not all pipes and hoses are connected correctly.

A process controller can provide n (number) of such Ethernet ports for different ME docks. The process controller itself hosts the logical entry point definitions (i.e. the I/O layout definition) for the number of ME which can be connected in parallel at any given point in time. That's for the infrastructure itself. The handling software (i.e. sequences, recipes) for each type of ME is configured in the controller once as a class based definition (master recipe). As soon as ME is docked and identified by the process controller a new instance of the handling software is derived from the class based definition (i.e. control recipe). The process controller is generally able to create as many control recipes as ME can be connected in parallel. This is independent whether these instances are from the same class or from different classes.

A verification procedure for the infrastructure is now described. The infrastructure verification can be simple (e.g. just checking the availability and activity of expected I/O cards) or be more complicated (e.g. sending actions to the ME and measuring expected reactions, i.e. a mini-loop check). In case the verification/check is okay, the procedure moves on. In case the verification/check fails, a failure procedure is executed that depends on the ME whether or not the process can recovered or should be aborted. In case this check is okay, the procedure moves on. In case this check fails, a failure procedure is executed that depends on the ME whether or not the process can be recovered or should be aborted. Provided the infrastructure is verified, the ME is now ready to be used by the host machine for controlling the industrial process.

Figure 5B:
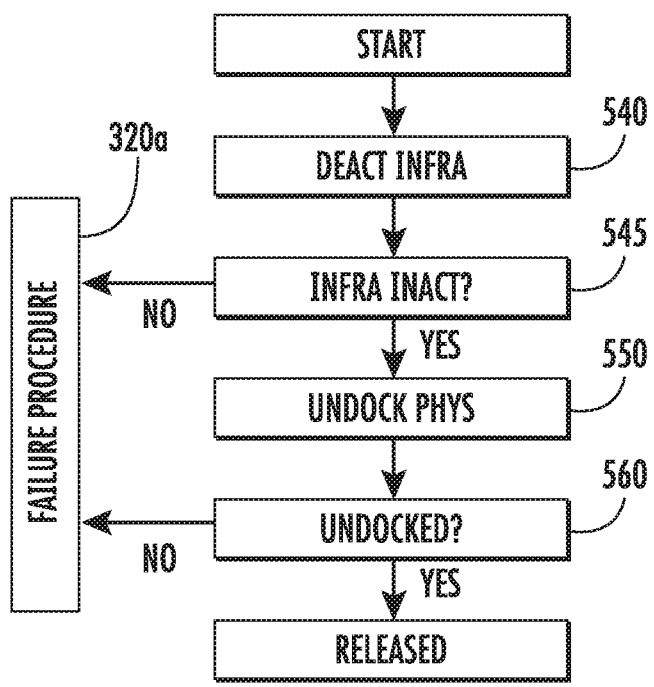
FIG. 5B is flow chart showing a sequence of steps for implementing use case 2.

FIG. 5B is flow chart showing a sequence of steps for implementing UC#2 beginning at start and ending in the ME being released. The start trigger for UC#2 can come from difference sources such as from an operator, batch recipe, or independent sequence. In order to ensure that the undocking process can be executed smoothly (without any failures which were detectable before the start), it is the responsibility of the trigger to verify and confirm any upfront start conditions. In the deactivating infrastructure state 540 the procedure deactivates the infrastructure tunnels which can be considered logical pipes, between the host controller and the ME in order to ensure that the physical undocking runs smoothly.

In this deactivation infrastructure state a variety of manual, semi-automated and automated procedures can be executed. It is then verified in step 545 whether the infrastructure has been successfully deactivated and the ME is ready for a physical undocking process which is step 550 which if successful reaches step 560 where the operator and/or some physical measurements is used to then confirm that the physical undocking process has been successfully executed. In case there has been a problem with the physical undocking a failure procedure shown as 320a is executed. The steps in the failure procedure can depend on the kind of failure and/or on the class of ME.

Figure 5C:
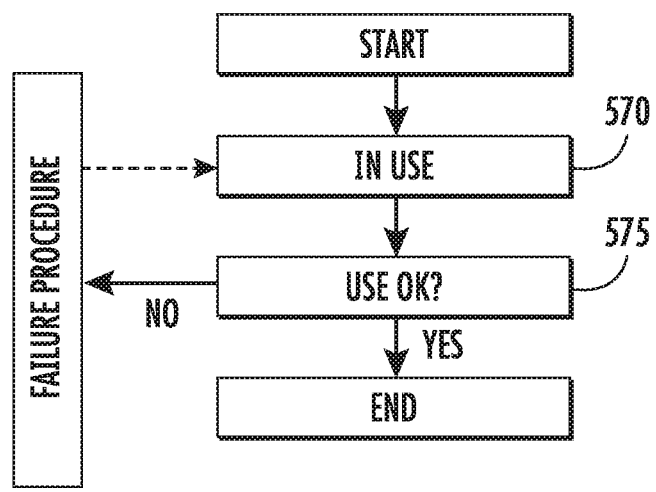
FIG. 5C is flow chart showing a sequence of steps for implementing use case 3.

FIG. 5C is flow chart showing a sequence of steps for implementing UC#3 comprising in the ME in use with checking/watchdog activities running. The start trigger UC#3 of an ME can come from sources such as the operator, batch recipe, or independent sequence. In order to ensure that the usage is smoothly (without any failures which were detectable before the start), it is the responsibility of the trigger to verify and confirm any upfront start conditions. The host machine can use all technical equipment provided by the ME. All communications can be executed through the infrastructure channel established with the ME during UC#1 (docking) described above. An ongoing decision during use 570 follows to determine in step 575 whether or not the use is still okay (i.e., infrastructure is okay, no other detectable issues). This check can be performed permanently or be based on the operation of the ME. The check type can depend on the class of the ME and/or on the operating status/mode of the ME.

EXAMPLES

Disclosed embodiments are further illustrated by the following specific Examples, which should not be construed as limiting the scope or content of this Disclosure in any way.

Figure 6A:
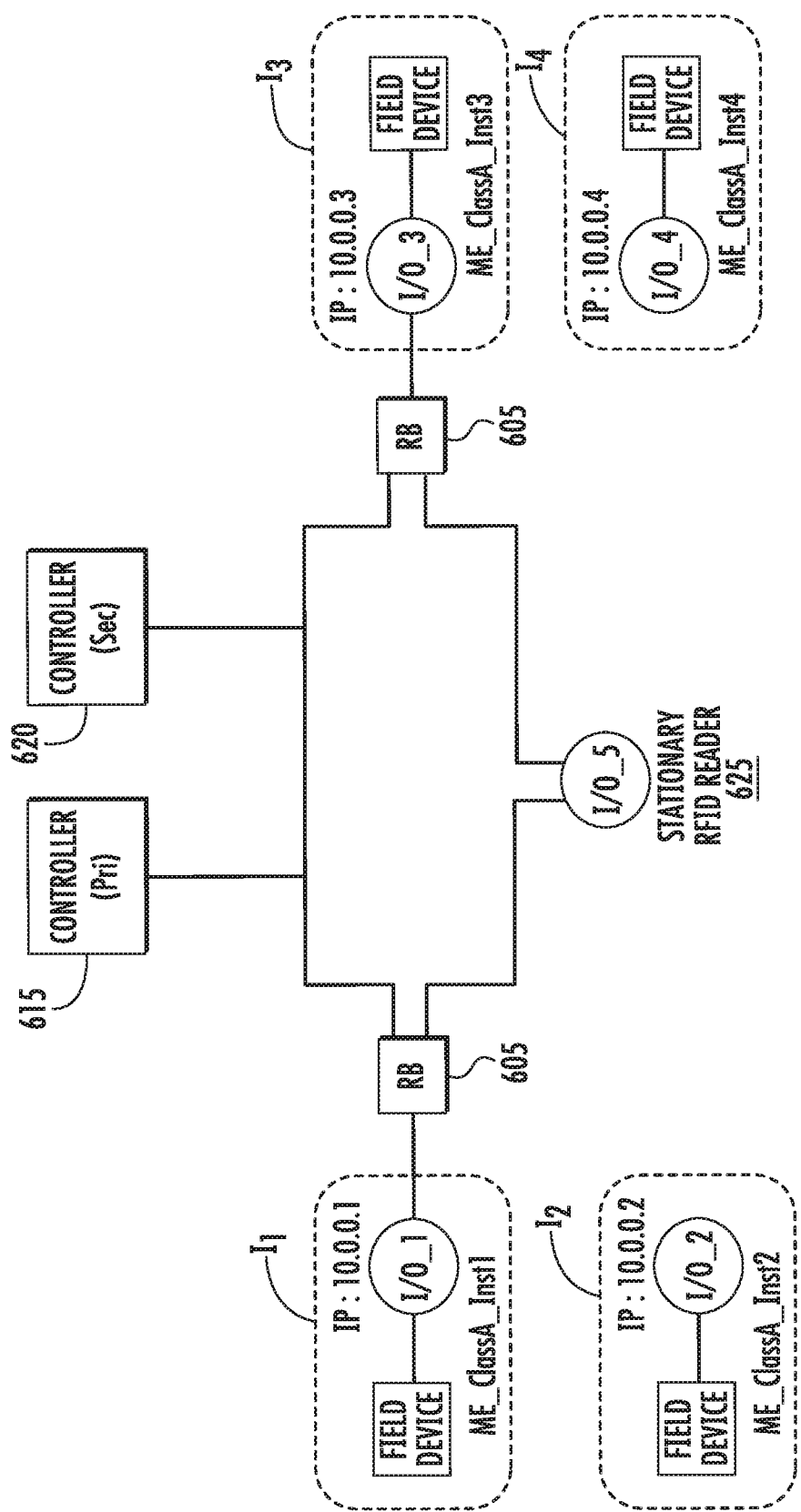
FIG. 6A shows a first example configuration showing 4 physical instances of class A ME, each having I/O's configured with different IP addresses, with 2 generic physical instances (instances 1 and 3) of class A ME docked at the process controller.

These examples describes an example solution approach for handling the connection and configuring of MEs at a process controller. FIG. 6A shows a first example configuration showing 4 physical instances of Class A ME, shown as instance 1 ($I_1$), $I_2$, $I_3$, $I_4$, shoed as 'Inst' each having I/O's configured with different IP addresses, with 2 generic physical instances (shown as $I_1$, and $I_3$) docked at the docking station. The redundancy boxes (RB) 605 shown act as switches to allow the controllers 615, 620 and the MEs to be attached in a ring topology, with a primary process controller 615 and secondary process controller 620 being shown. The process controllers 615, 620 also have an associated stationary RFID reader 625 comprising I/O 5 for reading the RF tags that may be on the MEs. As described above, all ME instances of a given class have same layout and/or purpose. In this example, this process controller configuration has 2 generic instances of the IOM configured for handling the class A type of ME.

Figure 6B:
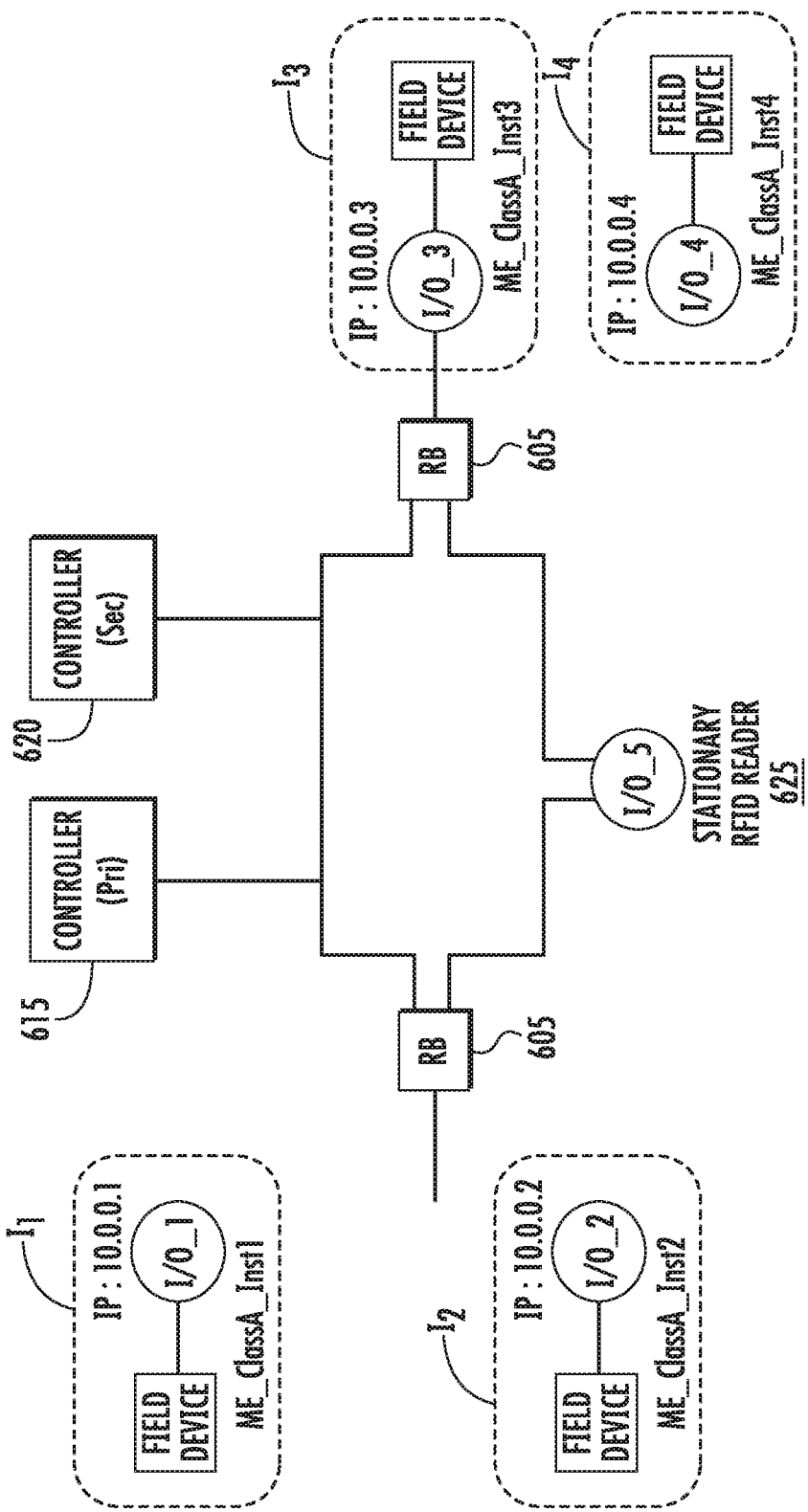
FIG. 6B shows the first example configuration showing 4 physical instances of a class A ME, each having I/O's configured with different IP addresses, with now only with physical instance 3 of Class A ME docked at the process controller.

FIG. 6B shows the first example configuration showing the physical instances of Class A ME in FIG. 6A $I_1$, $I_2$, $I_3$, $I_4$, each having I/O's configured with different IP addresses, with now only $I_3$ docked at the process controllers. This configuration results after deactivating the IOM corresponding to generic configuration instance of $I_1$ before physical disconnection of $I_1$ to make sure there are no alarms generated on the process controllers on losing connection to the I/O, then manual undocking of $I_1$. No new implementation is required as it is the operator and application's (algorithms) responsibility to take care of the above 2 steps.

FIG. 6C shows the first example configuration showing 4 physical instances of Class A ME in FIG. 6A and FIG. 6B $I_1$, $I_2$, $I_3$, $I_4$, each, each ME having I/O's configured with $I_2$, and $I_3$ docked at the process controllers. This is the resulting configuration after physical docking and confirmation of $I_2$, the RFID reader identifying the physical instance of $I_2$ by reading a set of numbers on $I_2$ which is translated to an IP address. It is the responsibility of the application (algorithm) configured in the process controllers to take care of converting the numbers to an IP address and identifying the generic I/O instance and changing the IP address of that I/O instance.

A solution approach for dynamically reconfiguring and connecting an ME in an industrial plant is now described. Regarding dynamic reconfiguration of an inactive IOM, only if the IOM is in an inactive state, the IP Address parameter of the IOM associated with a ME will be allowed to be changed at run time. A strategy configured in the controller will write a new value into the IP address parameter of the IOM. Upon IP address updating, the IOM will call "reconfigure" on the EIP I/O manager with the new IP address. Disclosed embodiments are not limited to EIP, which is a specific industrial protocol, and can be applied to other protocols like ModBus/TCP. The EIP I/O Manager internally takes care of closing the old EIP connection (with old IP address) and re-opening a new EIP connection (using the new IP address).

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of dynamically establishing a communication connection for mobile equipment (ME) to a process controller of an industrial processing facility (IPF) having processing equipment configured to run an industrial process, comprising:
   providing said process controller comprising a computing device including a processor with at least one accessible memory storing a plurality of different ME classes including a first ME class that said ME is in, wherein said computing device is configured to implement dynamic establishment of a communication connection for said ME to said process controller, said dynamic establishment including:
      reading a representation of a first industrial protocol for said ME while docked at said process controller;
      translating said representation to a first industrial protocol address, and
      setting said first industrial protocol address as a first configuration instance in its industrial protocol infrastructure blocks in said memory to render said ME an attached ME, and
      after undocking said ME, said process controller communicating with said attached ME while controlling said industrial process.

2. The method of claim 1, wherein said first industrial protocol comprises an Internet protocol (IP) comprising an Ethernet-based IP.

3. The method of claim 1, wherein said reading comprises said process controller using a radio frequency identification device (RFID) scanner reading an RFID tag on said ME.

4. The method of claim 1, wherein said industrial protocol infrastructure blocks consists of infrastructure only for each of said ME classes to be attached times a maximum number of instances of said MEs to be attached.

5. The method of claim 1, wherein said industrial process comprises a batch process.

6. The method of claim 1, wherein said computing device utilizes firmware stored in said memory to implement said establishment.

7. The method of claim 1, wherein said ME comprises a field device that is coupled to said process controller by an input output module (IOM).

8. A process controller, comprising:
   a computing device including a processor with at least one accessible memory storing a plurality of different ME classes including a first ME class, said computing device configured to implement dynamic automatic establishment of a communication connection for an ME to said process controller, said establishment including:
      reading a representation of a first industrial protocol for said ME that is in said first ME class while docked at said process controller;
      translating said representation to a first industrial protocol address;
      setting said first industrial protocol address as a first configuration instance in its industrial protocol infrastructure blocks in said memory to render said ME an attached ME, and
      after undocking said ME, said process controller communicating with said attached ME while controlling an industrial process run in an industrial processing facility (IPF) having processing equipment configured to run the industrial process.

9. The process controller of claim 8, wherein said first industrial protocol comprises an Internet protocol (IP) comprising an Ethernet-based IP.

10. The process controller of claim 8, wherein said reading comprises said process controller using a radio frequency identification device (RFID) scanner reading an RFID tag on said ME.

11. The process controller of claim 8, wherein said industrial protocol infrastructure blocks consists of infrastructure only for each of said ME classes to be attached times a maximum number of instances of said MEs to be attached.

12. The process controller of claim 8, wherein said computing device utilizes firmware stored in said memory to implement said establishment.

13. The process controller of claim 8, wherein said ME comprises a field device that is coupled to said process controller by an input output module (IOM).

* * * * *